US007161483B2

(12) United States Patent
Chung

(10) Patent No.: US 7,161,483 B2
(45) Date of Patent: Jan. 9, 2007

(54) INTEGRATED PROGRAMMABLE SYSTEM FOR CONTROLLING THE OPERATION OF ELECTRICAL AND/OR ELECTRONIC APPLIANCES OF A PREMISES

(75) Inventor: Hau Leung Stephen Chung, Hong Kong (HK)

(73) Assignee: Intexact Technologies Limited, Hong Kong (HK)

( * ) Notice: Subject to any disclaimer, the term of this patent is extended or adjusted under 35 U.S.C. 154(b) by 0 days.

(21) Appl. No.: 10/515,220

(22) PCT Filed: Dec. 17, 2003

(86) PCT No.: PCT/CN03/01075

§ 371 (c)(1),
(2), (4) Date: Nov. 22, 2004

(87) PCT Pub. No.: WO2004/077307

PCT Pub. Date: Sep. 10, 2004

(65) Prior Publication Data

US 2005/0246408 A1    Nov. 3, 2005

(30) Foreign Application Priority Data

Feb. 26, 2003  (HK)  ................................. 03101425

(51) Int. Cl.
*G08B 1/00* (2006.01)

(52) U.S. Cl. ...................... 340/531; 340/506; 340/3.1; 340/825.36; 340/825.49

(58) Field of Classification Search ................ 340/531, 340/506, 539.1, 3.1, 825.36, 825.49
See application file for complete search history.

(56) References Cited

U.S. PATENT DOCUMENTS

| 5,279,458 A | 1/1994 | DeWolf et al. |
| 5,400,246 A * | 3/1995 | Wilson et al. ................ 700/17 |
| 6,405,103 B1 | 6/2002 | Ryan et al. |
| 6,618,764 B1 * | 9/2003 | Shteyn ...................... 709/249 |
| 2002/0035404 A1 | 3/2002 | Ficco et al. |
| 2002/0103898 A1 | 8/2002 | Moyer et al. |

FOREIGN PATENT DOCUMENTS

| CN | 1241762 A | 1/2000 |
| CN | 1375674 A | 10/2002 |
| FR | 2744813 A | 8/1997 |
| WO | WO 00/46965 A2 | 8/2000 |
| WO | WO 02/059764 A1 | 8/2002 |
| WO | WO 02/089386 A2 | 11/2002 |
| WO | WO 03/005714 A1 | 1/2003 |

* cited by examiner

*Primary Examiner*—Daryl C Pope
(74) *Attorney, Agent, or Firm*—Bushanan Ingersoll & Rooney PC

(57) ABSTRACT

There is disclosed an integrated programmable system for controlling the operation of a number of electrical and/or electronic appliances of a premises, the application being controllable electrically, electronically, wirelessly, by infrared and/or by radio frequency, the system including a central data processing apparatus, e.g. a home server, or a central controller, connected with a common digital communication backbone, and the central data processing apparatus is connectable with the appliances via the digital communication backbone.

20 Claims, 12 Drawing Sheets

INTEGRATED PROGRAMMABLE SYSTEM FOR CONTROLLING THE OPERATION OF ELECTRICAL AND/OR ELECTRONIC APPLIANCES OF A PREMISES

This invention relates to an integrated programmable system for controlling the operation of electrical and/or electronic appliances of a premises, e.g. a house, a flat, or an office, and in particular such a system allowing the end user to program the mode and manner of operation of such appliances as he wishes.

With the advance of technology, home automation is a goal long sought to be achieved. Home automation will offer more freedom and autonomy to the disabled or elderly. Other members of the family will also benefit from the comfort and convenience offered by home automation.

Existing approaches to home automation are, however, proprietary in nature, and are non-extensible solutions that cannot accommodate the growth of the market. Each company or school has its own system and basic structure, which is not compatible with those of other companies or schools. In short, the systems and basic protocols are all vendor-specific.

In addition, existing home electrical appliances and electronic systems suffer from the following drawbacks and limitations:

a. The appliances are mostly self-contained and thus functionally separate from one another.
b. All functionalities and limitations of the appliances are pre-defined by the manufacturers/vendors.
c. Very few appliances are "cross-applicational", for example a motion detector connected to a standard security control panel cannot usually be used for occupancy energy saving or occupancy alarm purpose.
d. Various appliances may have some common functions. For example, an alarm clock which rings, a radio clock which tunes to a station at a certain pre-set time, a sprinkler control panel which turns on periodically, an occupancy energy saver which turns off lights after a predetermined period of no activity, and a VCR which records television programs all contain an internal clock. At a minimum, this is unnecessary duplication of resources. These internal clocks are also not synchronized with one another, adding to the difficulty of having multiple appliances work in concert with one another,
e. It is very difficult and sometimes impossible to add new functions to appliances which are not originally envisaged by the manufacturers/vendors.
f. Routing audio and/or video signals to different locations in the premises cannot be easily achieved without installing more wires. Usually, wiring is necessary between any possible pair of audio and/or video source and destination, resulting in a large number of wires for a full-scale installation.
g. Most appliances have their own respective remote control devices, which results in a large number of remote control devices being scattered around the premises, causing confusion and inconvenience.
h. In some situations, co-ordination of several devices is required. For example, for watching a DVD movie, the television has to be switched to AV mode, DVD video input and the appropriate digital audio mode have to be selected for the amplifier, the DVD player is then switched on to play the DVD disc, the shades have to be lowered and the lights to be dimmed. A user thus has to perform all these functions before he can sit down to, enjoy the DVD movie, and in reverse when he finishes watching the DVD movie, and wants to watch television again.

It can thus be fairly said that all the existing electrical and/or electronic appliances operate on a stand-alone basis, with very limited, if any, capacity for integration with one another for concerted operation. In particular, there is no way for central control and operation of such appliances. Even if in cases where integration of a number of such appliances of the same manufacturer is allowed, such is all pre-designed and pre-determined by the manufacturer, and is thus a closed platform. It is thus not up to the end user to integrate the functions of the appliances as he or she wishes, according to his or her own need in view of the physical environment.

Furthermore, in conventional security systems, security zones are set and are usually geographically oriented, e.g. one zone per room. Sensor devices in various zones are connected to a central security panel. Each particular zone may be individually armed or disarmed. Upon triggering of any device, and if the zone is armed, a pre-determined action is taken, e.g. an alarm is given. There is, however, no assessment of the situation, i.e. each trigger of the relevant sensor is considered to be a security event requiring action. It is not possible to assign a rating on the importance of the alarm signals given by each individual sensor device. For example, it is usually difficult to program a control panel to trigger an alarm signal only when a detector and a sensor are both activated within a short term of each other, and even with more advanced control panels, more devices and complex relationships are rarely supported. False alarms are thus common.

It is also difficult to exclude a particular sequence of activities or a particular device from a security profile unless the device is wired in its own zone, in which case it can be individually disarmed. It is thus usually impossible to set the system such that, for example, it ignores the sequence of events in which the bedroom door is opened, followed by motion in the stairs and motion in the kitchen (which collectively signify someone getting up for a drink), but sounds alarms in a reversed sequence of events, which collectively signify a burglar breaking in from the kitchen and going into the bedroom. The conventional systems thus force the users to accept either an indiscriminating all-secured scenario or an all-unsecured scenario.

It is thus an object of the present invention to provide an integrated programmable system for controlling the operation of electrical and/or electronic appliances of a premises, e.g. a house, an office, a factory, etc., in which the aforesaid shortcomings are mitigated, or at least to provide a useful alternative to the public.

According to the present invention, there is provided an integrated programmable system for controlling the operation of a plurality of electrical and/or electronic appliances of a premises, wherein said plurality of appliances are controllable electrically, electronically, wirelessly, by infra-red and/or by radio frequency, wherein said system includes a central data processing apparatus connected with a digital communication backbone, wherein said central data processing apparatus is adapted to be connected with said appliances via said digital communication backbone, characterized in that said system includes sound producing means connected to a plurality of sources of audio signals for selectively outputting sound upon receipt of audio signals from at least one of said sources or outputting audible alarm prompts upon receipt of audio signals from said system.

Embodiments of the present invention will now be described, by way of examples only, with reference to the accompanying drawings, in which.

Figure 1:
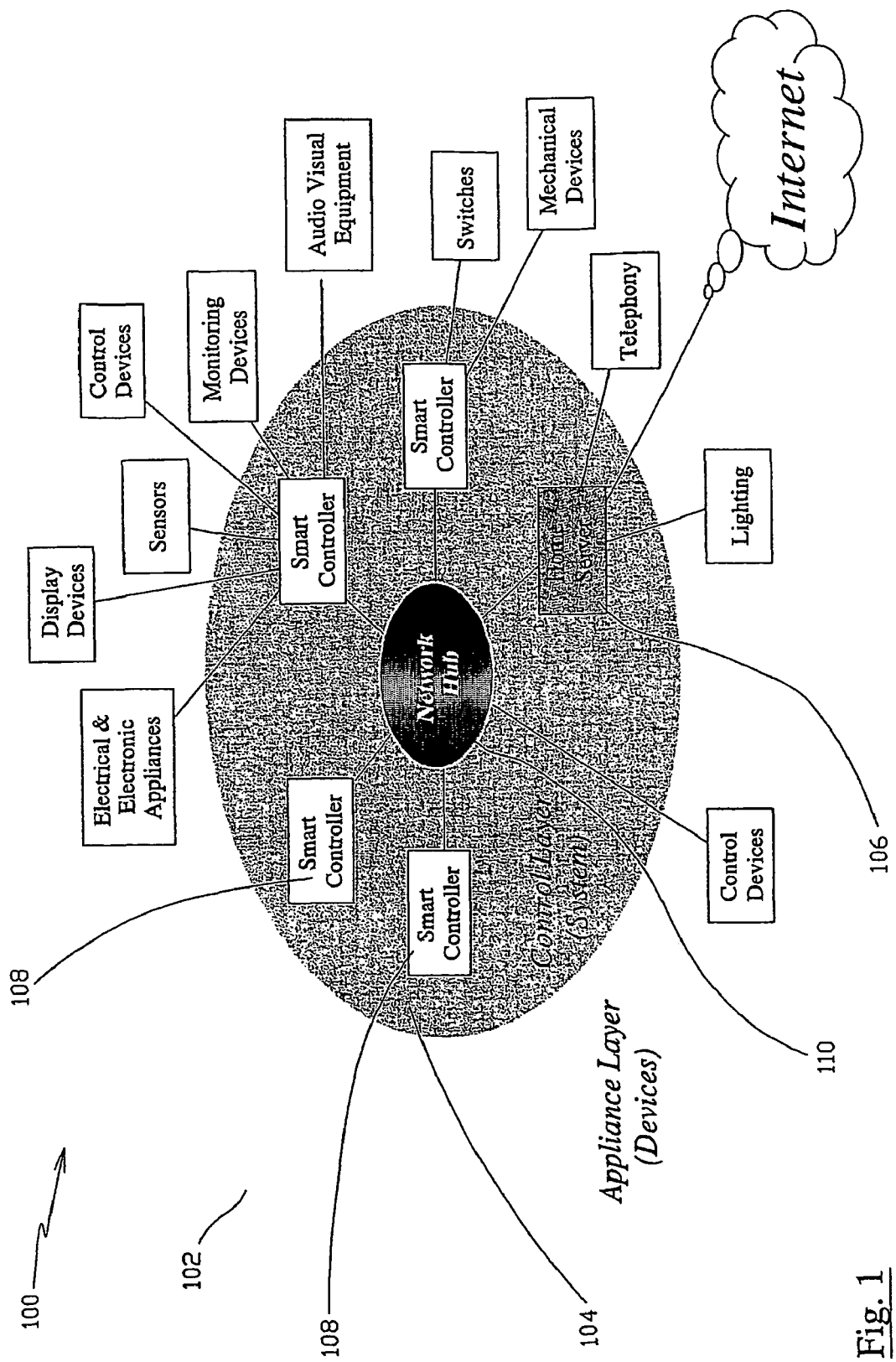
FIG. 1 is a first schematic diagram of a two-layered distributed network architecture design of an integrated programmable system according to the present invention for controlling the operation of electrical and/or electronic appliances of a premises.

Referring firstly to FIG. 1, such shows, at a first level of understanding, a schematic diagram of an integrated programmable system for controlling the operation of electrical and/or electronic appliances of a premises, e.g. a house, according to the present invention.

The fundamental design principles are:
1. The premises is constructed and viewed as a programmable platform, in which every aspect of the premises which are served by an electrical and/or electronic appliance are controllable via one or more programs written to the platform architecture.
2. Rerouting or rewiring connections to physical hardware does not require changing of the system configuration.
3. To minimize as much as possible hard-wired scenarios.
4. The system consists of a number of simplistic (dumb) components, each providing only one or a few simple generic services, and working in co-operation under the guidance and coordination of a central intelligence.
5. The components themselves do not preferably have intelligence.
6. Operations and desired features are implemented by mixing and/or matching of different services performed by the individual components.
7. All components are controlled and described by custom-built translators that expose standard interfaces to the central intelligence, so that the central intelligence does not have to be aware of the details of the specific service/hardware providers.
8. The system is controllable via a number of different user interfaces, e.g. Web browser, televisions with remote control apparatus, personal digital assistants (PDA), touch screens, cellular phones, etc.

As can be seen in FIG. 1, broadly speaking, an integrated programmable system, generally designated as 100, for controlling the operation of electrical and/or electronic appliances of a premises consists of a two-layered, distributed network architecture design, with an outer appliance layer 102 and an inner control layer 104. The appliance layer 102 includes various electrical and/or electronic appliances and devices, including, but not limited to, security sensors, monitoring devices, audio and/or visual equipment, telephony equipment, lighting apparatus, display devices, control devices, switches, and mechanical devices etc. All such appliances are connected to a central home server 106 in the control layer 104, either directly or indirectly, via a common digital communication backbone. The home server 106 allows the end user to control, adjust and program the criteria and manner of operation of the various appliances. The common digital communication backbone includes a central cable (bus) which connects all the appliances with the central control layer 104. The common digital communication backbone may be a single foil-shielded twisted-pair (FTP) CAMSe cable, which runs through the whole premises. Also incorporated in the control layer 104 are a number of smart controllers 108 each for directly controlling and monitoring the operation of one or more of the various electrical and/or electronic appliances in the appliance layer 102. The various smart controllers 108 are connected with the digital communication backbone and with one another via one or more network hubs, switches or routers 110, and via which the system 100 may also be connected with the Internet.

The smart controllers 108 may be implemented as book-sized form-factor industrial personal computers (PC). The actual hardware is PC-based, with a high-speed central processing unit (CPU), 256M random-access-memory (RAM) and a small (say 20–40 GB) hard disk drive, and a number of hardware devices implemented in the motherboard itself (e.g. 100 Base-T network, analog audio input/output, and 3D graphics). Each smart controller 108 runs a Microsoft® Embedded XP operating system. In each smart controller 108 is usually installed a PCI-based digital input/output (I/O) card with 24 to 84 digital inputs, although the system also supports many other brands of PCI-based, cPCI-based, ISA-based or RS232/RS485-based digital I/O modules on the market. Each digital I/O module card accepts switch inputs from a multitude of sensor devices connected to opto-isolated terminals on this card with straight electrical wires. Regulated power supplies provide 12V and 24V DC power, via electric wires, to these devices and equipment, e.g. motion detectors, smoke detectors, glass-break detectors, door and window contacts, gas and water sensors, etc. Contact switches are wired in serial with 12V DC supply into each input channel of the digital I/O card so that, when a device triggers (e.g. the relay switch closes), electricity at 12 volts will be supplied to the particular I/O channel.

Various devices and equipment may be connected directly to the smart controller 108 in the following manner:

communicating thermostats (which supports serial protocols) that control the heating, ventilating and air conditioning (HVAC) systems are connected to the smart controller's RS232 serial port, either directly or via a RS485 converter;

fingerprint scanners are connected to the smart controller 108 via either USB port or parallel port;

infrared receivers and infrared routers/emitters are connected to the RS232 serial ports of the smart controller 108;

some commercial equipment (e.g. plasma TVs and weather stations) also have built-in serial communication ports that can be connected to the RS232 serial ports of the smart controller 108;

microphones are connected to the audio input ports, and hardware is available on the sound cards to compress these audio streams into digital format (e.g. MP3) for transmission to other smart controllers or to the home server 106 either for playback or recording purposes;

pan-tilt-zoom video cameras are connected to the RS232 serial ports of the smart controller 108 for control, and their video outputs are connected either to the USB ports or to composite video input ports of one or more video capture cards installed in the smart controller 108. These video capture cards may contain hardware necessary to compress the video streams into digital format (e.g. MPEG2) for transmission, or the compression may be performed in software.

Each connection to a device or equipment is unique, described by an address. A central database in the home server 106 stores all the addresses of the device or equipment connected to the system 100. A device address contains all the necessary information to enable the system 100 to connect to that particular device or equipment and to communicate with it. Such information may include the serial port number to which the device/equipment is connected, communications protocol speed, equipment model number, signal timings, data formats, etc.

Figure 2:
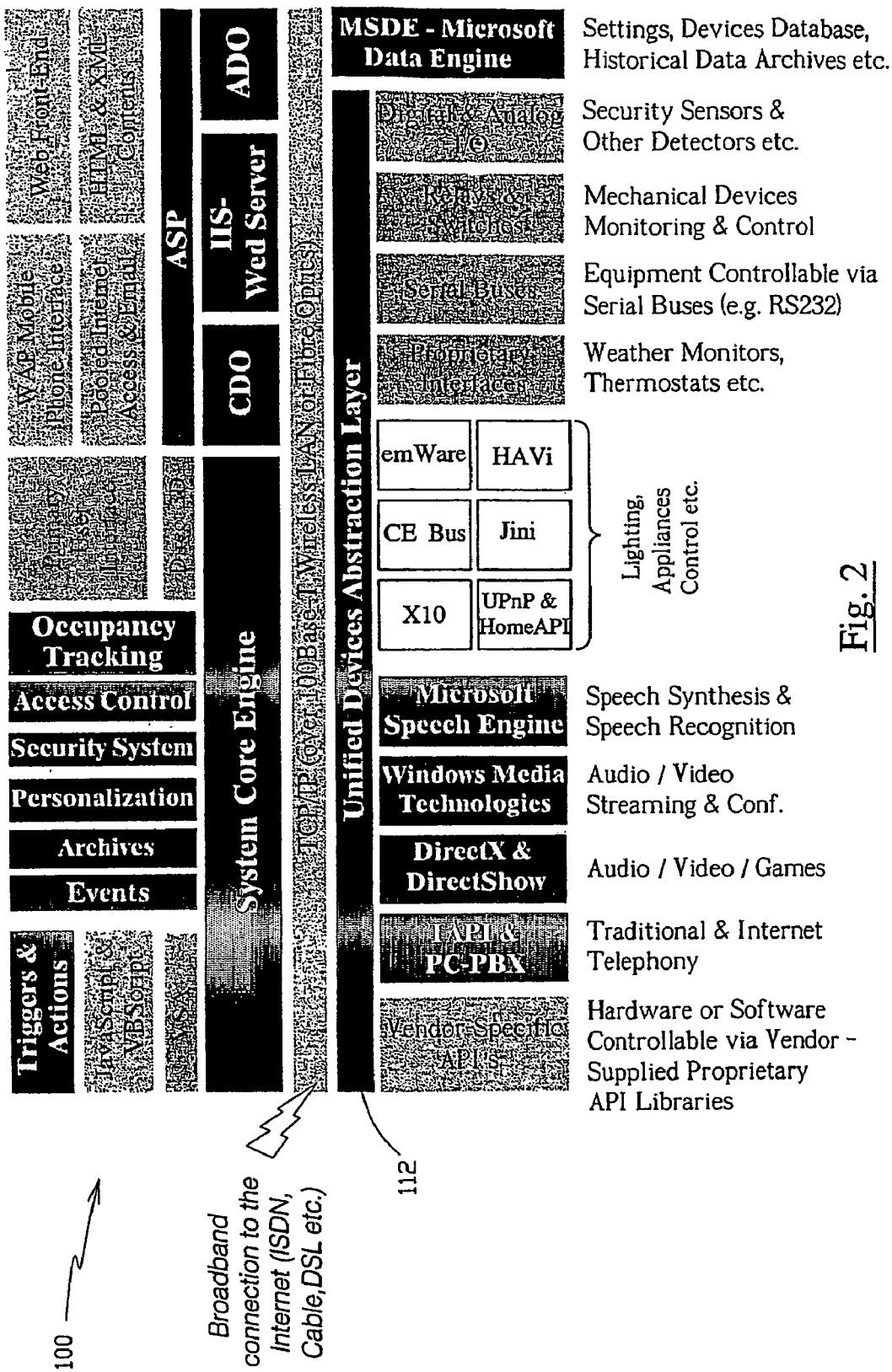
FIG. 2 is a second schematic diagram of the system shown in FIG. 1.

FIG. 2 shows the architectural structure of the system 100 at a more detailed level. The system 100 includes a Unified Devices Abstraction Layer (UDAL) 112, which corresponds, functional-wise, to part of the home server 106 shown in FIG. 1 and discussed above. The hardware equipment may be connected to the UDAL 112 via various standard interfaces. For example:

a. traditional and Internet telephony apparatus may be connected with the UDAL 112 via Telephony Application Programming Interface (TAPI) and Personal Computer-Private Branch Exchange (PC-PBX);

b. audio and/or visual and/or gaming apparatus may be connected with the UDAL 112 via DirectX or DirectShow, in which DirectX is a set of application program interface (API) developed by Microsoft Inc.;

c. lighting apparatus, various electrical and/or electronic apparatus, control apparatus, etc. may be connected with the UDAL 112 via:

1. X-10 electrical power control modules traded by X-10 Inc., of the US. Such modules are devices that plug into an electrical outlet and allow a user to remotely control the power to a lamp or an appliance that is plugged into them. There are also X-10 modules that may be installed in place of wall switches to control lights, and some can be used to set back a thermostat;

2. Universal Plug and Play (UPnP), a network architecture that provides compatibility among networking equipment, software and peripherals of the various vendors that are part of the Universal Plug and Play Forum;

3. CEBus Standard, a non-proprietary protocol based upon an open standard (EIA 600) set down by the CEBus Industry Council, which allows every CEBus HomePnP™ device to communicate with every other CEBus HomePnP™ device over the power line without the need for new wires. Such CEBus HomePnP™ devices can be networked with a central controller for larger and more extensive automation projects;

4. Jini, a software from Sun Microsystems;

5. remote device management interfaces provided by emWare, Inc. of the US;

6. Home Audio Video interoperability (HAVi), a vendor-neutral audio-video standard allowing different home entertainment and communication devices (such as VCRs, televisions, stereos, security systems, video monitors) to be networked together and controlled from a primary device, e.g. a personal computer. Using IEEE 1394 as the interconnection medium, HAVi allows products from different vendors to comply with one another based on defined connection and communication protocols and API. One of the key features of HAVi is its ability to easily add new devices to the network. When a new device is installed, the system will configure itself to accommodate it. Other services provided by the distributed application system include: addressing scheme and message transfer, lookup for discovering resources, posting and receiving local or remote events, streaming and controlling isochronous data streams;

7. proprietary interfaces;

8. standard serial bus interfaces, e.g. RS232, 422, 485, USB, and FireWire™. FireWire™ is the name given by Apple Computer Inc. to products supporting the IEEE 1394 standard, which is a very fast external bus standard that supports data transfer rates of up to 400 Mbps;

9. relays and switches; and 10. digital and analog input/output interfaces.

As there are, at least in theory, unlimited types of devices or equipment, and different ways to communication with or control them, it is necessary for the smart controller system software to translate communication protocols and commands for individual devices or equipment into a uniform schema for easy adaptation into the system 100. Such program logics form the Unified Device Abstraction Layer, and the uniform schema format is the Unified Device Space.

A possible Unified Device Space format may be a simple device name plus a property name, as in the following Table 1:

| Device Name | Property Name | Meaning |
| --- | --- | --- |
| TV | PowerOn | Status of the power button |
| TV | Channel | The current channel number |
| TV | Volume | Audio volume |
| Air Conditioner | CurrentTemp | Current room temperature |
| Air Conditioner | TargetTemp | Target temperature |
| Air Conditioner | PowerOn | Status of the power button |
| Air Conditioner | FanOn | Status of the fan button |

The system software translates actual device status and setting values into this Unified Device Space format. For instance, the TV may be a "legacy device", i.e. one that does not have built-in digital communication capabilities. A light sensor may be connected to the digital I/O board to detect whether the TV power LED is turned on. If so, it will set the "PowerOn" property of the "TV" device to be true. A physical current sensor may be connected to an analog voltage meter to detect the volume level. In order to turn on/off the TV or to change channel/volume, an infrared emitter device may be called on to emit the relevant infrared remote-control codes. The air conditioner may be controlled by a communicating thermostat. In this case, finding out the current temperature and power status, etc. can be effected by sending the relevant text command via the serial cable connected to the thermostat through its RS232 port and waiting for a response, in a format specified by the air conditioner's communications protocol. In the first case, i.e. the case with the "legacy" TV, the system software translates a number of physical measurements into logic values represented in the Unified Device Space. In the second case, the system software translates the air conditioner's communications protocol into values in the Unified Device Space.

The benefit of the Unified Device Space is that, within the present system 100, all other system modules can work with a uniform way of controlling, measuring and detecting devices and their statuses and settings. To a system customization script (see below), the user simply has to issue:

SetDeviceProperty ("TV", "PowerOn", True)
SetDeviceProperty ("A/C", "PowerOn", True)

to turn on both the TV and air conditioner. The system software automatically translates these Unified Device Space commands into the appropriate infrared codes sent by the infrared emitter to the TV, as well as the appropriate text commands sent via RS232 to the thermostat of the air conditioner.

As to the common digital communication backbone, such may be of the Transmission Control Protocol (TCP)/Internet Protocol (IP) or FR/ATM (Frame Relay/Asynchronous Transfer Mode) or a virtual private network (VPN), over a cable under 100 Base-T (Fast Ethernet) standard (IEEE 802.3u), a wireless local area network (LAN), or fibre optics.

The system 100 may be connected with the Internet via integrated services digital network (ISDN) standard, cables, digital subscriber lines (DSL), etc. The system 100 includes a Primary User Interface which allows an end user to interact with the Unified Devices Abstraction Layer, including the home server 106 of the system 100, and via Direct3D, which is an application program interface for manipulating and displaying three-dimensional objects, for programming, setting, resetting and/or changing the manner of operation of the various components and appliances connected with the system 100. Some other acronyms appearing in FIG. 2 have the following meanings:

"WAP" stands for Wireless Application Protocol, which is a secure specification that allows users to access information instantly via handheld wireless devices, such as mobile phones, pagers, two-way radios.

"HTML" stands for Hyper Text Markup Language, which is the authoring language used for creating documents on the World Wide Web. HTML defines the structure and layout of a Web document by using a variety of tags and attributes.

"XML" stands for Extensible Markup Language, which is a specification specifically designed for Web documents. It allows designers to create their own customized tags, enabling the definition, transmission, validation, and interpretation of data between applications and between organizations.

"ASP" stands for Active Server Pages, which is a specification for a dynamically created Web page with a .ASP extension that utilizes ActiveX scripting. When a browser requests an ASP page, the Web server generates a page with HTML code and sends it back to the browser.

"ADO" stands for ActiveX Data Objects, which is Microsoft's high-level interface for data objects. ADO is very general and can be used for accessing all sorts of different types of data, including web pages, spreadsheets, and other types of documents.

"IIS" stands for Internet Information Service, which is Microsoft's Web server that runs on Windows NT platforms.

"VBScript" stands for Visual Basic Scripting Edition, a scripting language. VBScript is based on the Visual Basic programming language, but is much simpler. It enables Web authors to include interactive controls, such as buttons and scrollbars, on their Web pages.

Figure 3:
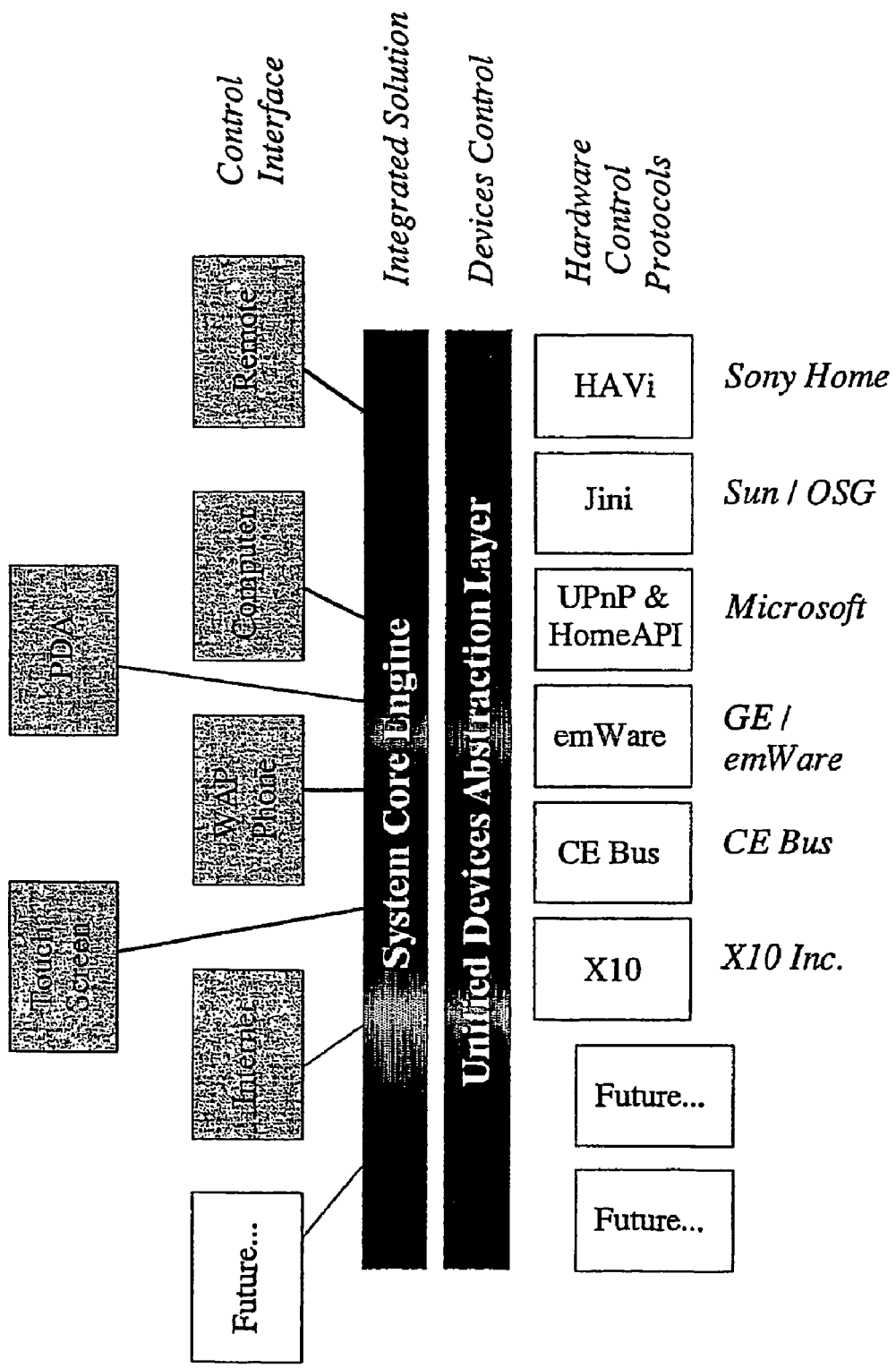
FIG. 3 is a third schematic diagram of the system shown in FIG. 1.

FIG. 3 shows the integration of the hardware protocols, the Unified Devices Abstraction Layer, also representing the common communication backbone, the system core engine, and the control interface. With particular reference to the control interface, it can be seen that the system 100 may be controlled by operating over the Internet, a WAP phone, a computer, a remote control device, a touch screen, or a personal data assistant (PDA) etc. With the advance of technology, some other protocols and/or interfaces may be incorporated into the existing system.

Figure 4:
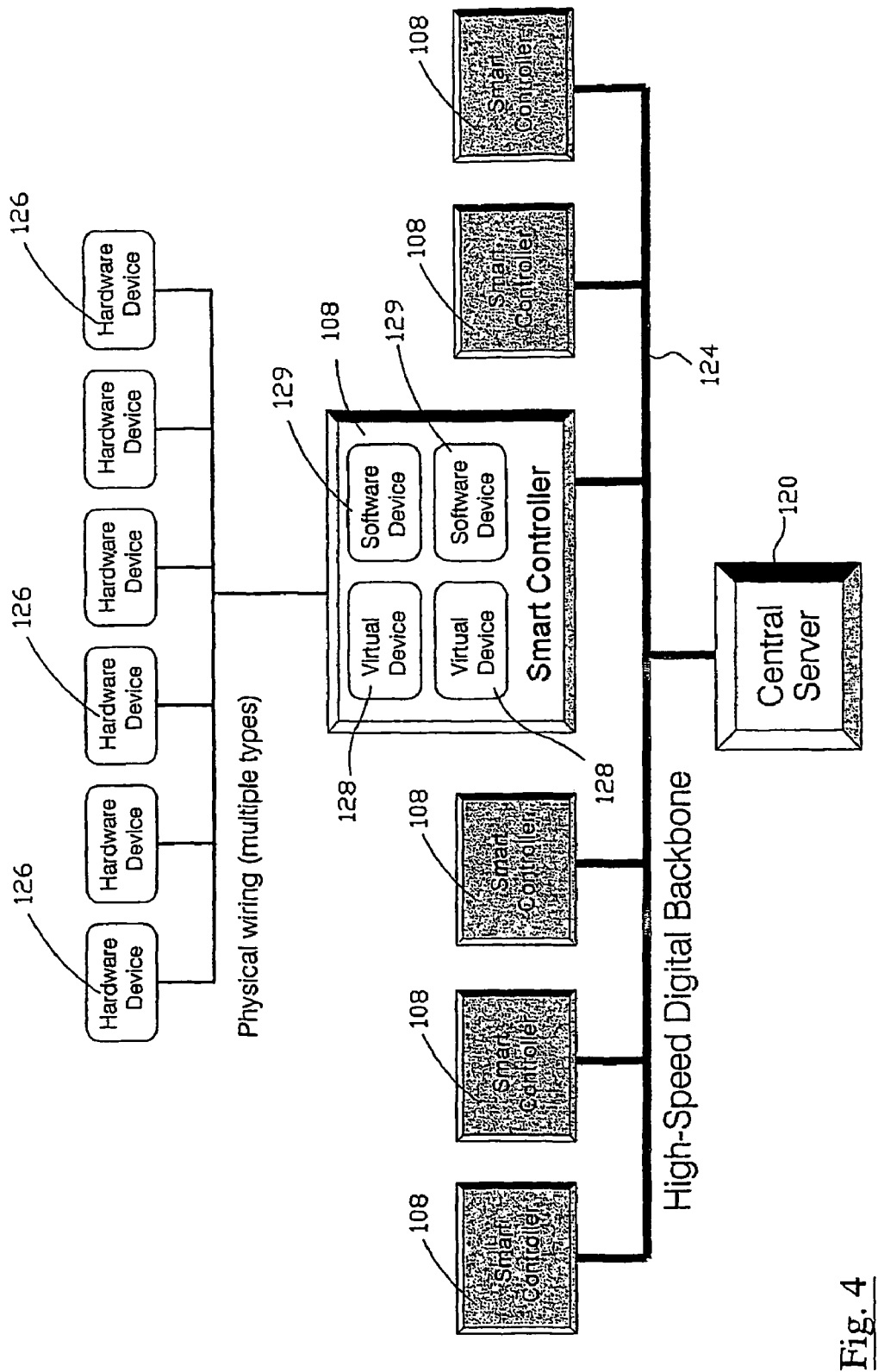
FIG. 4 is a schematic diagram showing the physical architecture of the system shown in FIG. 1.

FIG. 4 shows a schematic diagram of the system 100 at a yet further different level. The system 100 includes a central controller 120, which corresponds to the home server 106 shown in FIG. 1. The central controller 120 is connected with a number of the smart controllers 108, via a high-speed digital backbone 124, corresponding to the common digital communication backbone. Each smart controller 108 is connected with a number of electrical and/or electronic appliances, i.e. hardware devices 126, via physical wiring of various types. Most such hardware devices 126 are connected to smart controllers 108 that are physically located closest to them. Such hardware devices 126 may, however, be connected directly to the central controller 120. For the purpose of this invention, a smart controller 108 has processing power, its own operating system, application software, a number of virtual devices 128, software devices 129, and other converter hardware to communicate with the hardware devices 126 connected with it.

A software device is a device that exists only in software and has no necessary hardware to match. Such may include speech generators, which exist in software implementation only, which take simple text and generate sound signals. These sound signals may then be fed to an amplifier to produce the sound.

A virtual device is an appliance which pretends to be an actual hardware device, even though in reality it only simulates such a device by performing appropriate actions on another hardware device. An example of virtual device usage can be found in a PABX system. The PABX hardware supports a number of central-office phone lines, plus a number of extension phones. If virtual devices are designed for such a PABX system, it may include virtual phone devices that simulate regular simple phone lines, even though in reality it calls upon the PABX system to perform the duties. The user of such a virtual phone device may not need to know that the phone is not a regular phone line, but part of a PABX system.

The central home server 106 consists of a high-speed PC-based system with a hard disk storage of 160 GB and RAM of 512 MB, connected to the digital communication backbone. It runs the Microsoft® Server 2003 operating system, and is physically connected to all other smart controllers 108 in the same system 100 via a TCP/IP network. Inside the home server 106 is also run the Microsoft® Data Engine (MSDE), which is a relational database engine storing all the device setup information (addresses) for the entire system 100. The home server 106 is also connected to an X10 automation controller, via RS232, that is in turn plugged into the electrical mains. The X10 automation controller acts as a bridge to control a number of devices and equipment which understand the X10 power-line carrier protocol. The home server 106 also contains the Microsoft® Internet Information Server (IIS), together with a web-application writing in ASP (ActiveX Server Pages) that allows a user to control the system via a standard web browser.

The home server 106 has sufficient hard disk space to store digitized audio files (for whole-premises audio), digitized video files (for video-on-demand), video and audio recordings (e.g. from close circuit TV cameras, telephony answering messages, etc.), and other system set-up files in network-shared folders. The smart controllers 108 may request these files when they need to play back audio or video in a particular room or house area. The homer server 106 may also act double as a smart controller for a number of rooms and areas in the premises.

The home server 106 automatically runs system software upon start-up that does the following:
  detects and establishes communications with each smart controller 108 in the network;
  maintains a collection of customization scripts (stored in the database) written in scripting languages (VisualBasic, VBScript or JavaScript) that will be triggered upon particular system events;
  maintains a snapshots of all the devices and equipment in the system 100, together with the current values of all states and settings of each device or equipment. These values are kept in Unified Device Space format, so that any smart controller or customization script may read from the database without knowing the physical details of the device or equipment;
  waits until notified by the smart controllers 108 that a particular state or setting of a particular device or equipment has changed value;
  when notified of a change, identifies if any customization script should be run due to that change, and, if so, executes the script;
  when a script calls for a particular device or equipment to perform a particular action, e.g. turn the power on, sends a request in Unified Device Space format, to the smart controller that is handling that particular device or equipment;
  logs any necessary change notifications in the database for historical reference; and
  keeps an internal clock that wakes up periodically to check whether any scheduled event (defined via customization script) should be run.

As an example, when an occupant of the premises wants to enter the premises closed by a locked door, he/she places his/her finger on a fingerprint scanner connected to a smart controller 108. The smart controller 108 will then poll the fingerprint scanner for images periodically and detects the new image. It understands that this represents a change of value for a particular status of the fingerprint scanner, i.e. the previous image was blank. It then sends a notification to the home server 106, in Unified Device Space format, notifying it that the device "Fingerprint" has changed the property "Image" to the new image. Upon receipt of this notification, the homer server 106 will check through its database and notices that, when the "Image" property has changed for the device "Fingerprint", then the customized script "CheckFingerprint" should be run. It then executes the script "CheckFingerprint", which first checks the fingerprint with fingerprints stored in the database, to determine a match. If a match is found, it sends a request to set the "Open" property of the device "DoorLock" to "true". The smart controller 108 handling the door lock, upon receiving this commands, translates the command into the appropriate physical action, which is to turn on a digital output channel in the Digital I/O board to energize a relay switch that sends 12 volts to the electric door strike, opening the door.

The following is a sample script suitable for controlling the opening or otherwise of the front gate of the premises, upon scanning of a fingerprint image by the fingerprint scanner, receipt of data from a smart card, or entry of code via a keypad, as well as other actions of various devices and equipment of the system following opening of the front gate.

```
' Check identity of person
Dim Name As String
Select Case TriggerSource
    Case "FINGERPRINT"
        ' Fingerprint scanned
        Name = IntelliHome.LookupUser(UserID)
        If Not (Name Is Nothing) Then
            ' Track location
            IntelliHome.LocationTracking("FRONTYARD") = UserID
        Else
            ' Fingerprint not found
            IntelliHome.Devices("FRONTYARD_Speakers", "TextToSpeech") = "Fingerprint not recognized. Access denied."
            Return
        End If
    Case "CARD"
    Case "KEYPAD"
        ' Keypad code entry or access card
        Dim CanEnter As Boolean = False
        ' Is the key code (or access card) allowed to open the front gate?
        If IntelliHome.CheckSecurity(KeyValue, "OPENFRONTGATE") Then
            Dim contact As Integer = IntelliHome.LookupCode(KeyValue)
            If contact >= 0 Then
                Name = IntelliHome.LookupUser(contact)
                IntelliHome.LocationTracking("FRONTYARD") = contact
            Else
                Name = " "
            End If
```

-continued

```
                CanEnter = True
            End If
        If Not CanEnter Then
            If Trigger.TriggerProperty = "CARD" Then
                IntelliHome.Devices("FRONTYARD_Speakers", "TextToSpeech") = "Invalid access card. Access denied."
            Else
                IntelliHome.Devices("FRONTYARD_Speakers", "TextToSpeech") = "Invalid entry code. Access denied."
            End If
            Return
        End If
    Case Else
        Return
End Select
' Disarm perimeter - but retain security of inside
IntelliHome.Devices("FRONTYARD_Speakers", "TextToSpeech") = "Welcome home, " & Name & ". Perimeter is disarmed. Please enter."
IntelliHome.DisarmSecurity("FRONTYARD")       ' Disarm security in the front yard
IntelliHome.DisarmSecurity("GARDEN")          ' Disarm security in the back garden
IntelliHome.DisarmSecurity("GARAGE")          ' Disarm security in the garage
' Open front gate
IntelliHome.Devices("FRONTYARD_FrontGate", "Open") = True
' Turn on lights if after 6 pm or too dark
Dim LightsOn As Boolean = False
If System.DateTime.Now.Hour < 7 Or System.DateTime.Now.Hour > 17 Or IntelliHome.Devices("LightSensor", "Light") > 0.5 Then
    IntelliHome.Devices("FRONTYARD_FloodLights", "On") = True
    LightsOn = True
End If
' Turn lights off and close the gate after one minute
System.Threading.Thread.Sleep(60000)
If LightsOn Then IntelliHome.Devices("FRONTYARD_FloodLights", "On") = False
' Close front gate
IntelliHome.Devices("FRONTYARD_FrontGate", "Open") = True
```

Figure 5:
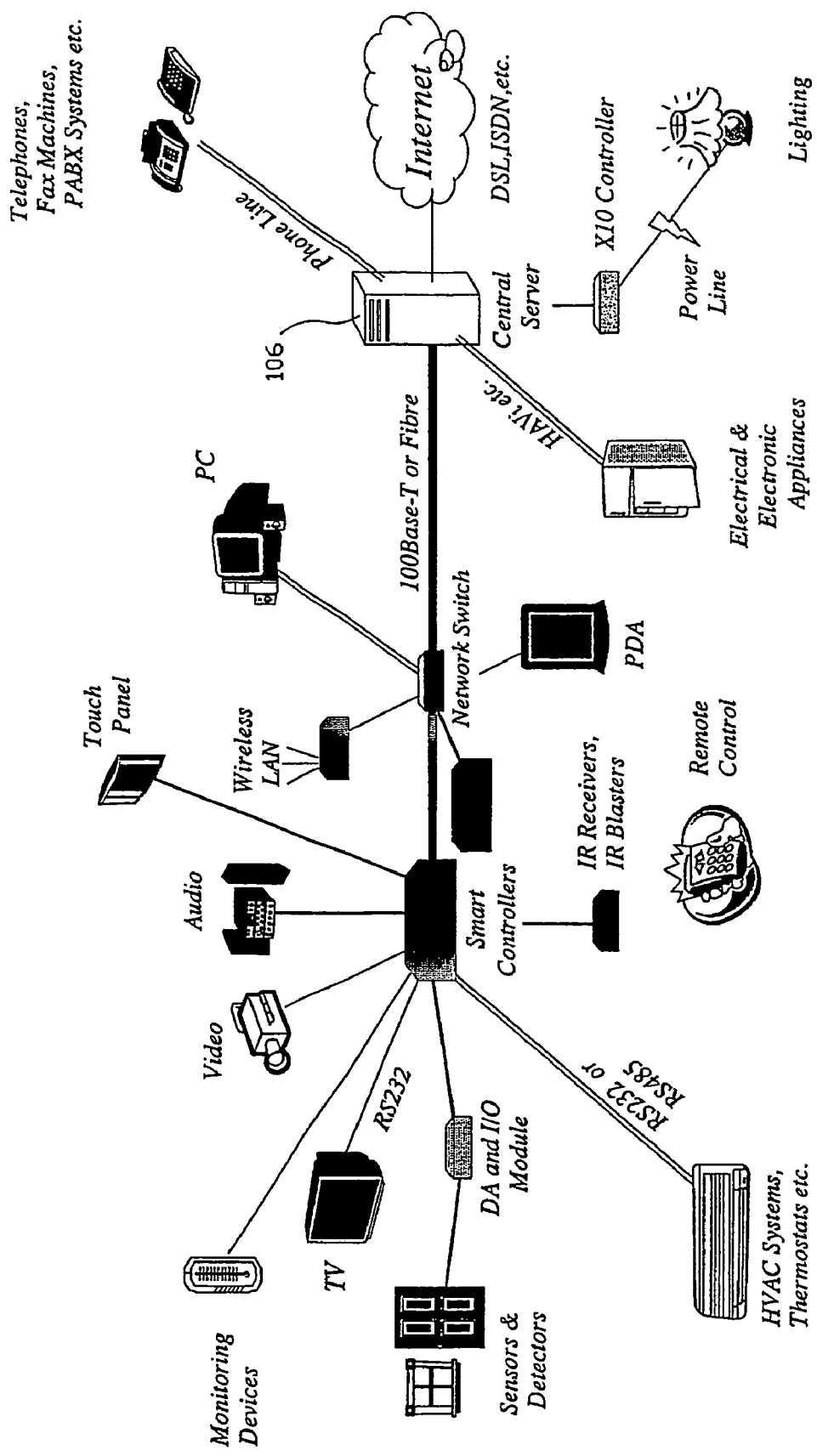
FIG. 5 is a schematic diagram showing the networking of various electrical and/or electronic appliances in the system shown in FIG. 1.

FIG. 5 shows a schematic diagram of the system 100 at a still further different level. As can be seen, various electrical and/or electric components and devices are connected via a central digital common communication backbone with the home server 106, via various standard interfaces, e.g. HAVi, digital/analog and input/output modules, X-10, telephone lines, and serial bus, e.g. 232 (RS232) interfaces.

Figure 6:
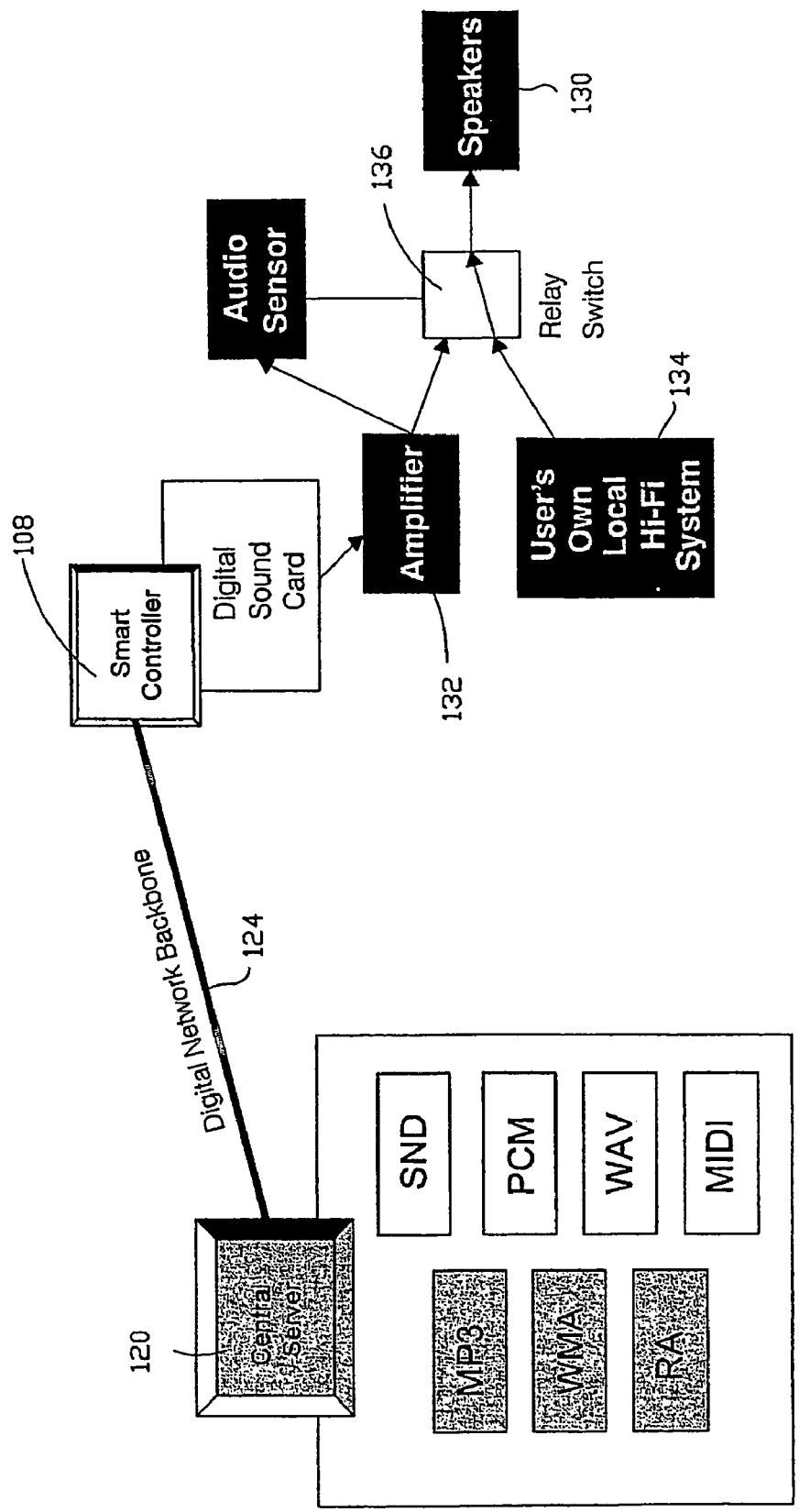
FIG. 6 is a schematic diagram showing reproduction of audio signals in the system shown in FIG. 1.

FIG. 6 shows a schematic diagram of a digital distributed audio module, forming part of the system 100. The central controller 120, which corresponds to the home server 106 shown in FIG. 1, contains an archive of pre-recorded audio files in compressed digital formats, e.g. MP3, WMA, RA, SND, PCM, WAV, MIDI, etc. The central controller 120 is connected to each smart controller 108 via the digital network backbone 124. Each smart controller 108, among other features, is connected to sound generating hardware for producing audio recording from the digital stream. In particular, the smart controller 108 is connected to one or more speakers 130 via an amplifier 132. To enhance the flexibility and/or the audio quality, a local Hi-Fi system 134 may be connected to the speaker 130 via a relay switch 136. The system is so designed that audio signals from the smart controller 108 will always take precedence over those from the local Hi-Fi system 134, in particular because some audio prompts from the smart controller 108, e.g. alarms, must be heard.

The speakers are connected to an amplifier, which is in turn connected to the digital audio output port of the smart controller 108. Audio signals produced by the smart controllers 108 (e.g. music, or system alert messages) is amplified and outputted via the speakers. If the smart controller 108 controls more than one set of speakers, then separate digital sound cards are installed in the smart controllers 108, each sound card being connected to a separate amplifier connected to each set of speakers. There may be a separate local high-end Hi-Fi system in some rooms, e.g. the entertainment room. In this case, both the speaker line outputs from the amplifier connected to the smart controller 108 and the speaker line outputs from the local Hi-Fi system are connected to the inputs of a relay switch (the local system to the normally-closed input, and the smart controller 108 to the normally-open input), with the output of the relay switch connected to the actual speakers. The relay switch is activated by an audio signal sensor, which is connected to the analog audio output of the smart controller 108.

By way of such an arrangement, when no audio signal is played by the smart controller 108, the relay switch will stay in the normally-closed position, which connects the local Hi-Fi system to the speakers. Upon audio signals generated by the smart controller 108, the audio signal sensor will energize the relay switch, which will then switch to the normally-open position, disconnecting the local Hi-Fi system and connecting the smart controller amplifier with the speakers. Thus, any audio output from the smart controller 108 will override audio output from the local system. This is crucial as certain system-generated audio output (e.g. alert messages, warning messages) must be heard and should thus override any other audio streams currently playing. When the smart controller 108 stops outputting audio signals, the audio signal sensor will de-energize, and the relay switch will return to the normally-closed position, thus disconnecting the smart controller 108 and re-connecting the local Hi-Fi system with the speakers.

The benefits of such an arrangement include:
- the number of physical wires is reduced, in particular as a digital communication backbone is used for carrying almost all types of programs and audio signals;
- such enables the use of the same set of hardware for all audio generation purposes;
- pre-recorded audio pieces are shared among all zones;
- different audio pieces may be played in each different zone, at its own respective pace;
- the same audio piece may be played in different zones, which are geographically remote from each other; and
- local Hi-Fi systems are seamlessly integrated into this arrangement.

Figure 7:
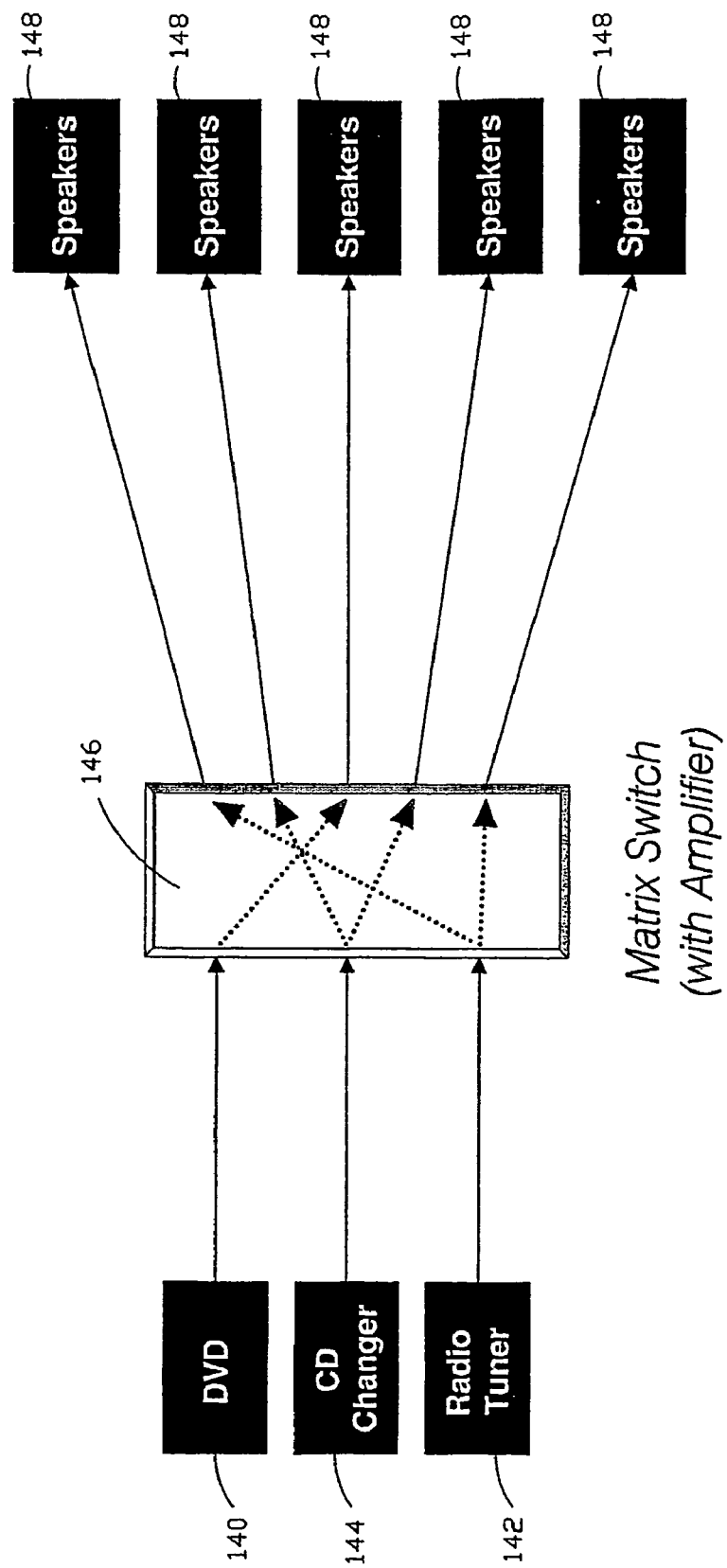
FIG. 7 shows a known way of achieving audio distribution.

In contrast, FIG. 7 shows a schematic diagram of a known way of achieving audio distribution module, which is both costly and less flexible. Source devices, e.g. DVD players 140, CD changers 144, radio tuners 142, MD decks, etc. are located at a central location. Audio signals from the source devices are fed into a matrix switch 146, either amplified or pre-amplified. The matrix switch 146 is mapped to a number of zones, each representing a room or a particular designation of audio signals. Speaker wires extend out of the matrix switch 146, one set for each zone, directly to the speaker(s) 148 in the particular zone. The matrix switch 146 is controlled by various control devices, e.g. remote controls, wall panels, etc. At any one time, a particular program source is connected (switched) to a particular zone, enabling the speaker(s) 148 in the zone to receive the output of the program source. Separate routing technologies have to be used for controlling separate program source devices, e.g. infrared remote devices use infrared radiation to transmit remote control signals to one of the source devices, and radio frequency remote control apparatus may control a device via radio frequency signals.

Figure 8:
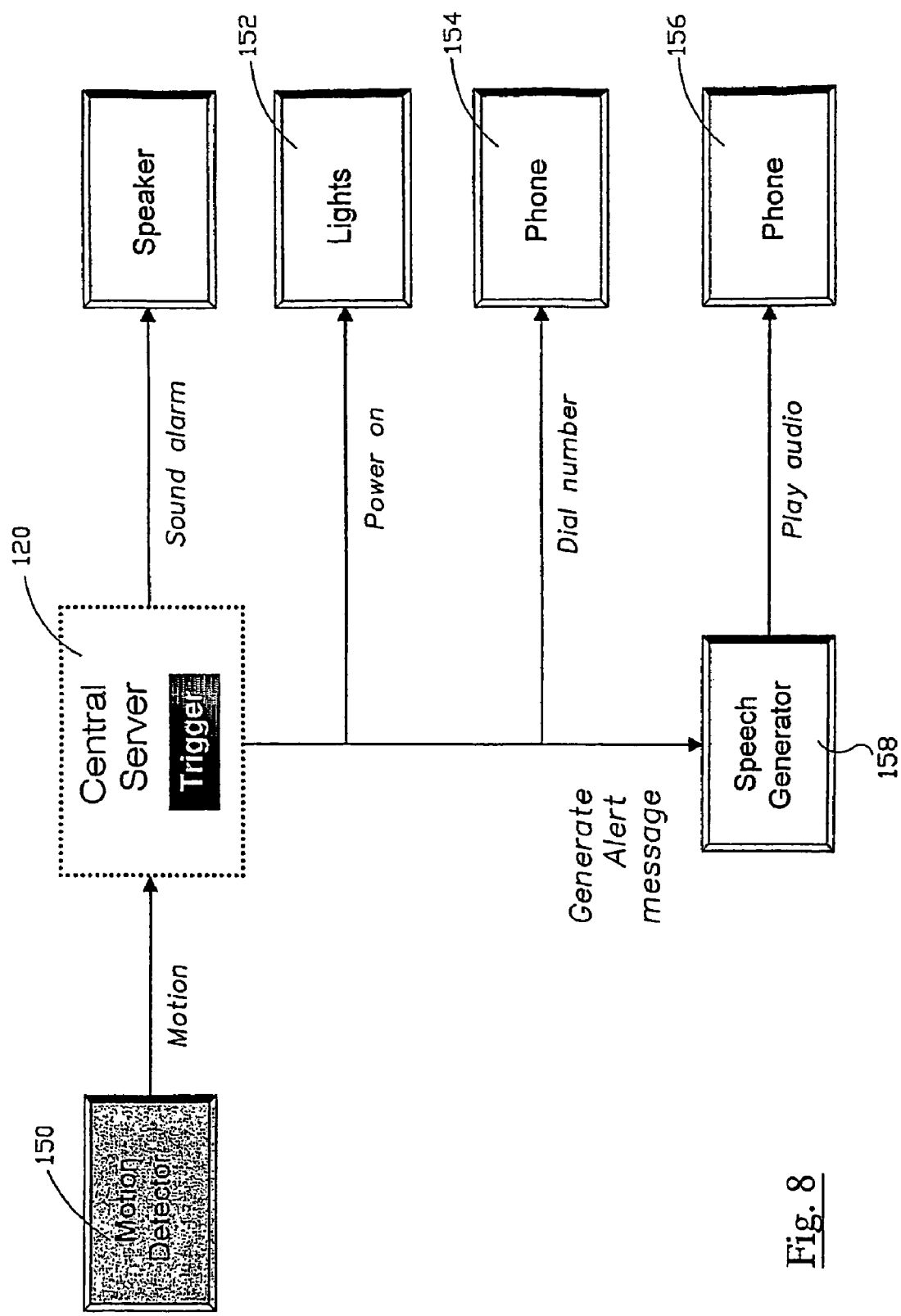
FIG. 8 is a schematic diagram of an integrated security system forming part of the system shown in FIG. 1.

FIG. 8 shows a schematic diagram of a programmable security feature, forming part of the system 100. In this security system, a motion detector 150 for detecting motion is connected via the common digital communication backbone with the central server 120 of the integrated programmable system, which is in turn connected with (a) a speaker, which maybe the speaker 130 of the digital distributed audio module shown in FIG. 6, for producing pre-recorded audio message; (b) lights 152, (c) a telephone 154 directly for dialing a pre-determined telephone number, and/or (d) a telephone 156 via a speech generator 158 for producing synthesized audio message and transmitting same through the telephone 156.

By way of such an arrangement, the security feature may be constructed of components of other existing systems, e.g. a motion detector of a security system, a speaker of an audio-visual system, existing lighting system, and a telephone of a telephony system, etc.

Figure 9:
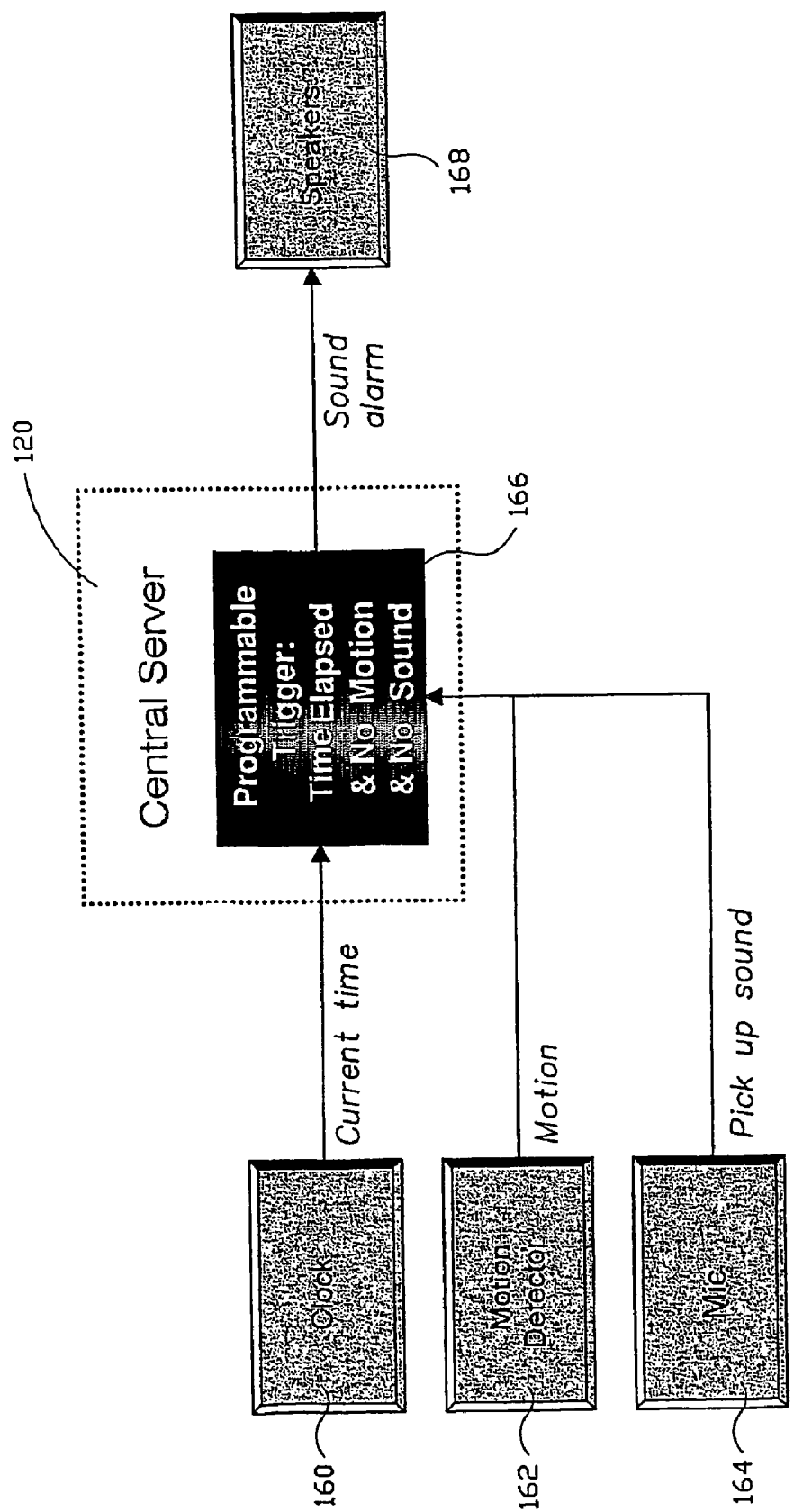
FIG. 9 is a schematic diagram of an integrated elderly monitoring system forming part of the system shown in FIG. 1.

FIG. 9 shows an integrated elderly monitoring feature, forming part of the system shown in FIG. 1. In this elderly monitoring feature, a clock 160, a motion detector 162, and a microphone 164 are connected, via the common communication backbone, to the central server 120 of the system 100. The central server 120 contains a programmable logic 166 which has been pre-set such that, if neither motion nor sound is detected for a pre-determined period of time (as counted by the clock 160), alarming signals will be outputted by speakers 168 which may, again, be the speaker 130 of the digital distributed audio module shown in FIG. 6.

Figure 10:
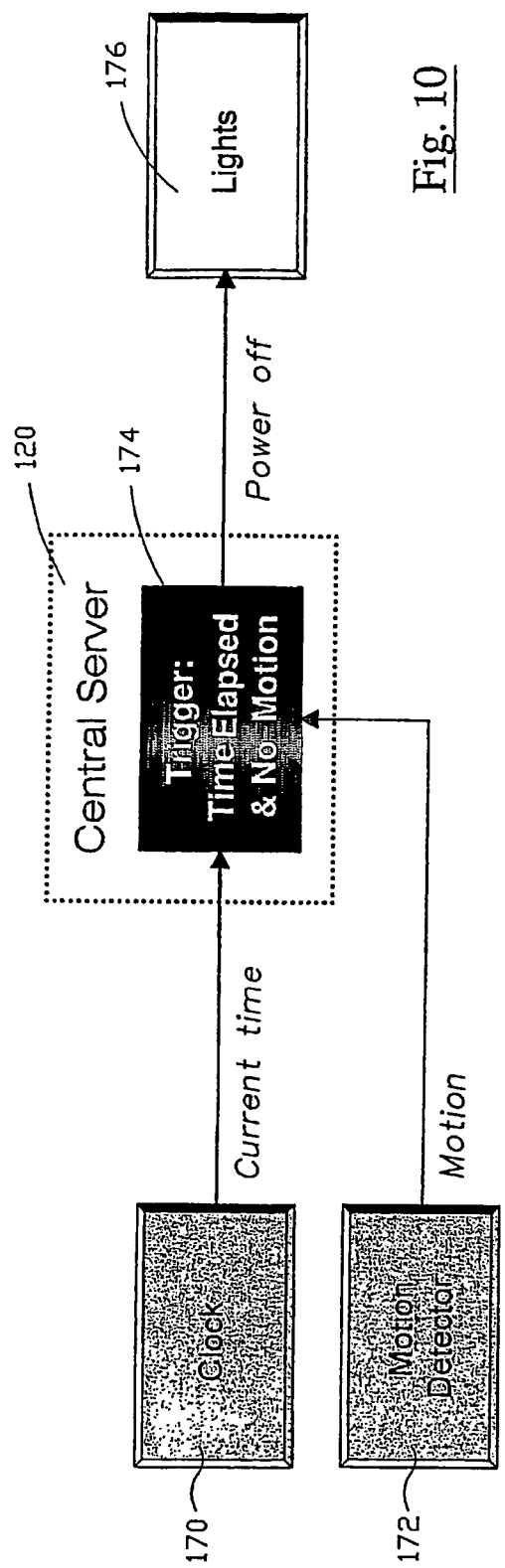
FIG. 10 is a schematic diagram of an integrated occupancy energy saving system forming part of the system shown in FIG. 1.

FIG. 10 shows an integrated occupancy energy saving feature, forming part of the system shown in FIG. 1, consisting of a clock 170 and a motion detector 172 connected, via the common communication backbone to the central server 120 of the system 100. The central server 120 contains a logic 174 which has been pre-set such that, if neither motion nor sound is detected for a pre-determined period of time (as counted by the clock 170), lights 176 also connected with the system will be switched off, so as to save energy consumption. It should be understood that the clock 170 in this occupancy energy saving system may be the same as the clock 160 in the integrated elderly monitoring feature discussed above.

Figure 11:
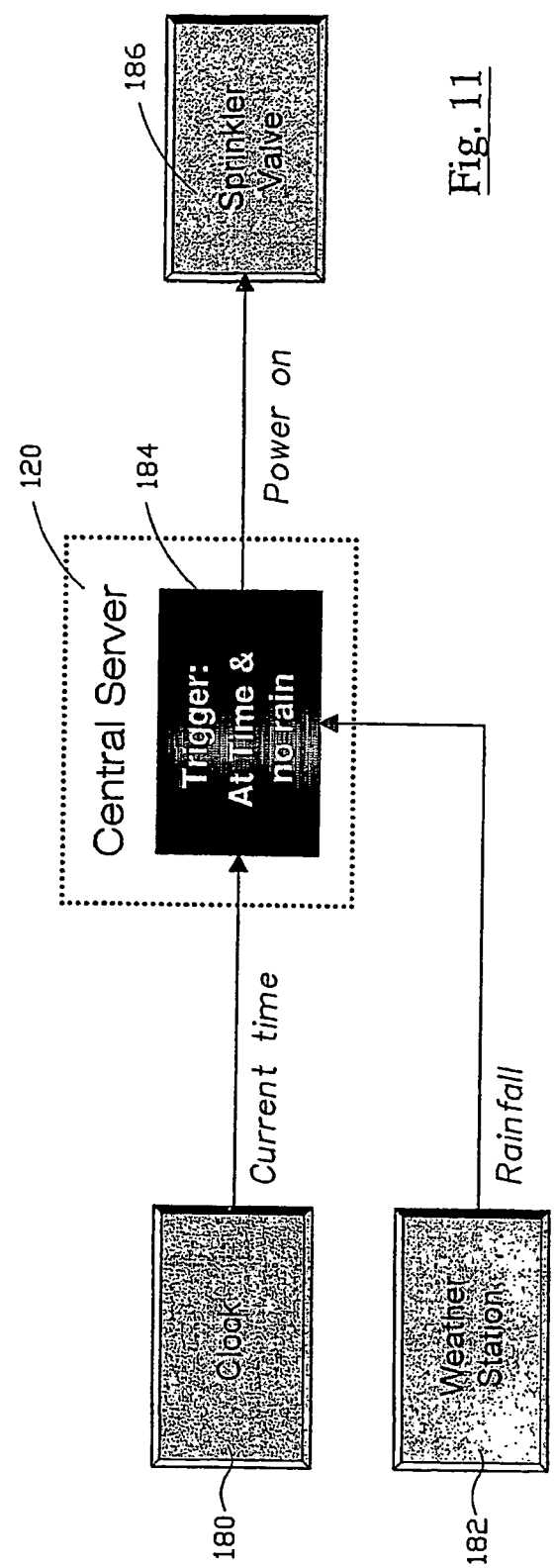
FIG. 11 is a schematic diagram of an integrated automatic sprinkler system forming part of the system shown in FIG. 1.

FIG. 11 shows an integrated automatic sprinkler system, forming part of the system shown in FIG. 1. The sprinkler system includes a clock 180 and an electronic weather station 182 connected, via the common communication backbone to the central server 120 of the system 100. The central server 120 contains a logic 184 which has been pre-set such that, if no rain falls when a pre-determined time (as counted by the clock 180) is reached, a sprinkler 186 also connected to the system will be activated.

Figure 12:
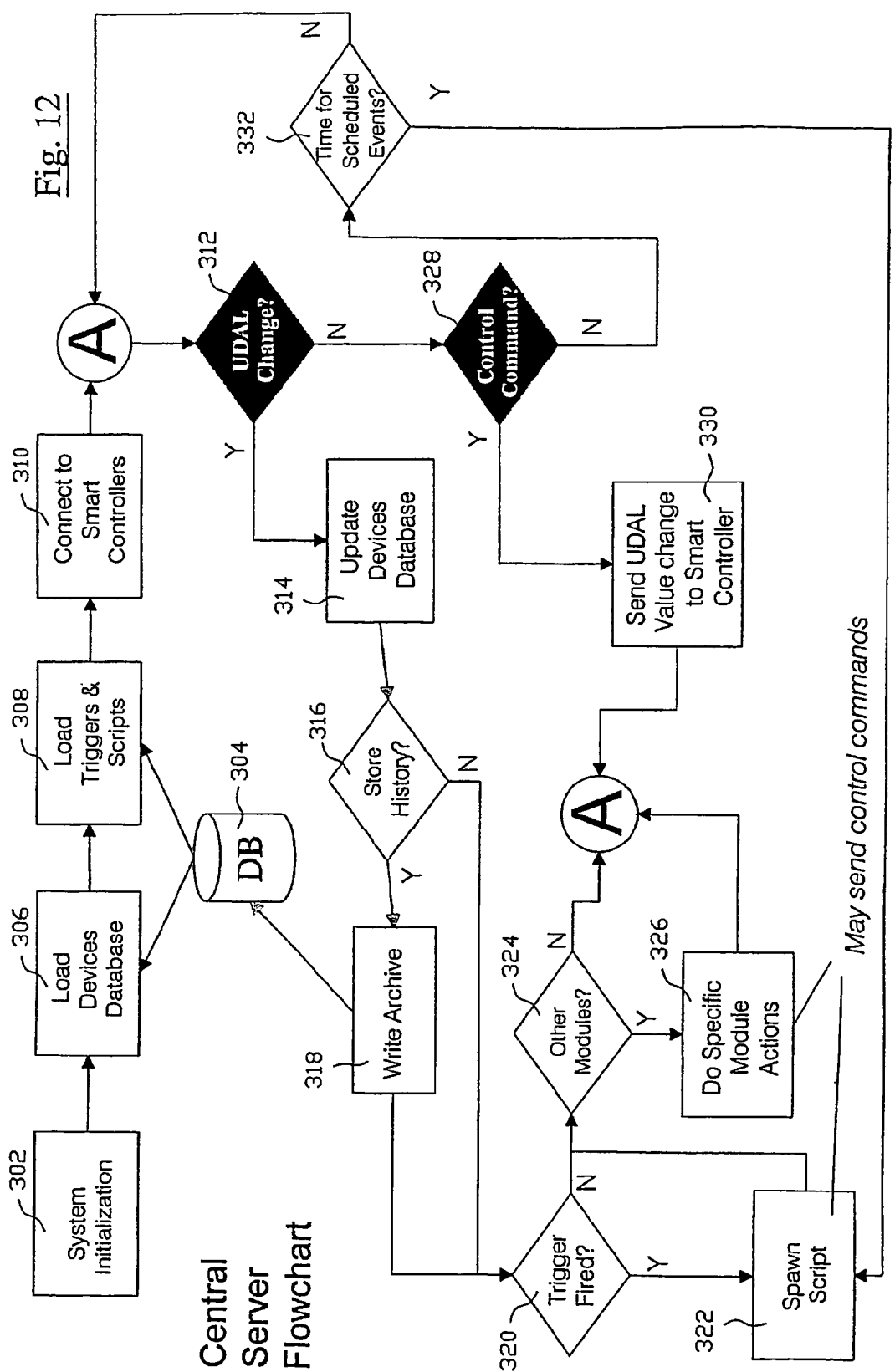
FIG. 12 is a flow chart of the operation of the central server in the system shown in FIG. 1.

FIG. 12 is a flow chart showing the operation of the central server 120 discussed above. When the system 100 is activated, it is first initialized (step 302). The device database 304 is loaded (step 306), followed by loading of triggers and scripts (step 308). The smart controllers 108 are then connected (step 310). The system 100 will then check if there has been any change in or to the UDAL (step 312). If so, the device database 304 will be updated (step 314), and if the history is to be stored (step 316), the archive will be written (step 318). The system 100 will then check if trigger has been fired (step 320). If yes, it will spawn script (step 322), but if not, it will check other modules (step 324), and if a positive result is detected, the specific module action will be carried out (step 326), e.g. by sending appropriate control commands. If, on the other hand, there is no change in or to the UDAL, the system will check for control command (step 328). If the result is positive, UDAL value change will be sent to the smart controllers 108 (step 330). If not, a clock in the system will check if it is time for some scheduled events (step 332). If yes, it will spawn the appropriate script (step 322), but if not, the system 100 will resume checking if there has been any change in or to the UDAL (step 312).

Figure 13:
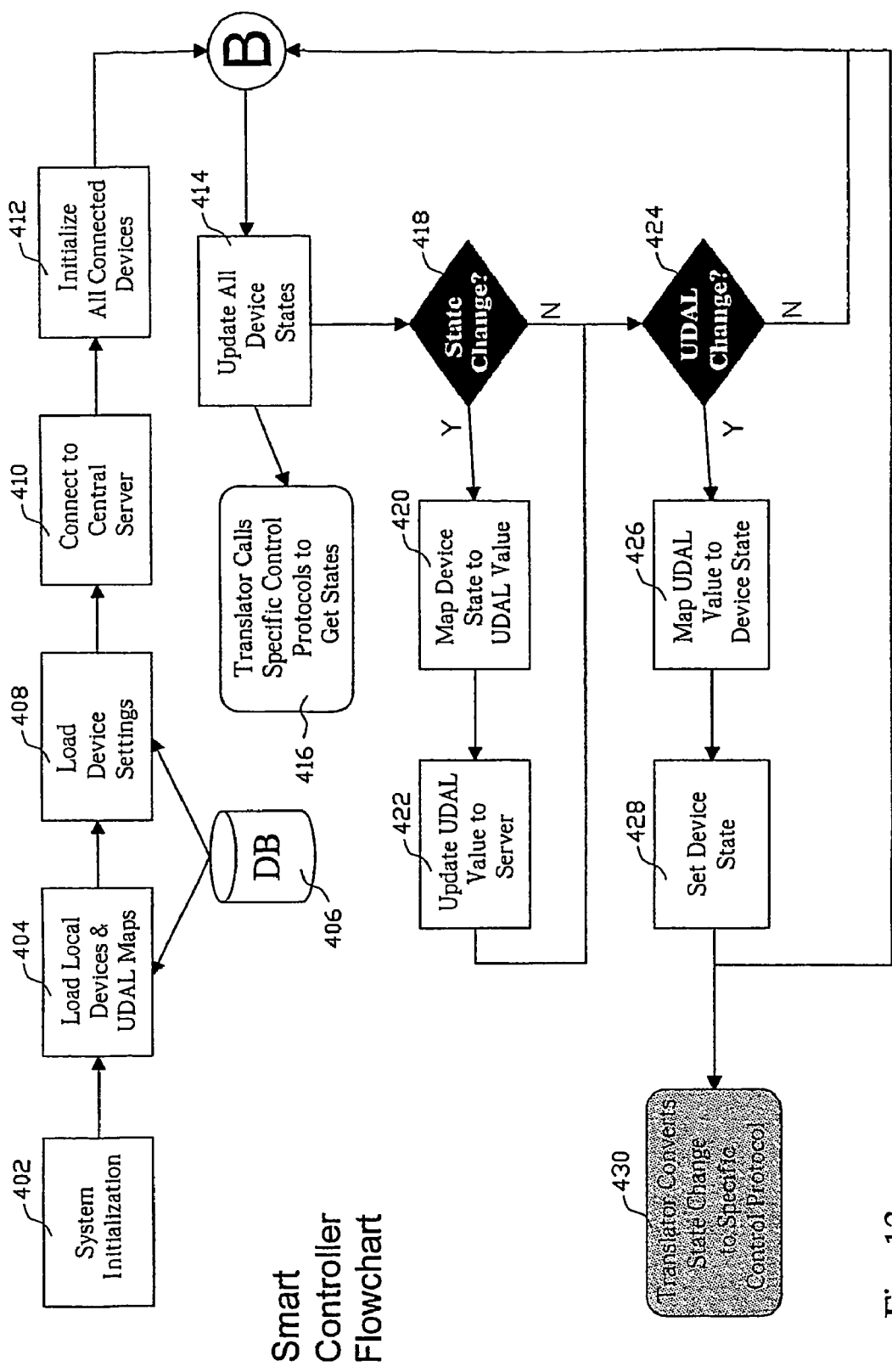
FIG. 13 is a flow chart of the operation of the smart controller in the system shown in FIG. 1.

As to FIG. 13, such is a flow chart showing the operation of the smart controller 108 discussed above. When the system 100 is activated, the system will be initialized (step 402), and local and device UDAL maps will be loaded (step 404) from the database 406. The device settings will also be loaded (step 408) from the database 406. The smart controller 108 is then connected to the system 100 (step 410). The controllers 108 then scan through the central database and identify all devices and equipment connected to each respective controller 108 and gets their addresses. All connected devices are also initialized (step 412). Each device/equipment is initialized with the information provided by its respective address. This is done via a separate piece of program logic specifically developed for each type/brand/model of device or equipment. Some devices or equipment, e.g. sound cards for audio generation, are installed inside the smart controller 108. These devices/equipment are controlled in the same manner as devices/equipment external to the smart controller 108, although in the case of devices/equipment installed inside the smart controller 108, communication is usually much more reliable and instantaneous, since they do not have to send signals to the smart controller 108 via physical wires. All device states are then updated (step 414). Translators exist to call specific control protocols to get the status of their states (step 416).

The smart controller 108 will maintain communication with the devices/equipment. The equipment may send a notification message automatically when a state or a setting has changed, e.g. the state of a thermostat will change when there is a change in the temperature. The equipment, e.g. digital I/O modules, may on the other hand require periodic polling to discover its current status and settings, which are then compared with the system's internal copy of the states and settings in order to discover whether any of them has changed.

The system 100 will then continuously check if there has been any change in the state of the various devices and equipment (step 418). If there has been any change in a state or setting of a device/equipment, the smart controller 108 to which the device/equipment is connected will send information to the home server 106, such that other programs or other smart controllers may act on this information. The device state will be mapped to the UDAL value (step 420), and the UDAL value will then be updated in the server (step 422). After this updating (step 422), or if there has not been any change in the state, the system will then check if there has been any UDAL change (step 424). If there has been any UDAL change, the UDAL value will be mapped to the device state (step 426), and the device state set accordingly (step 428). The translators will then convert the state change to specific control protocol (step 430) for operation of the appliances or devices connected with the smart controllers 108. In particular, the translators can translate proprietary means of controlling individual devices into standard interfaces, thereby to allow the system 100 to control and accommodate with electrical and/or electronic devices in a uniform manner. When instructed by the system 100, the smart controller 108 will act upon such request to control or initiate actions on the device/equipment. The particular means to accomplish such actions depend on the brand and model of the equipment, and the communication protocol used by that piece of equipment. The smart controller 108 also puts up a user interface from the graphics chip, with its output connected directly to a visual output, e.g. a TV set, to enable the user to control the system 100 using the TV.

With the present invention, it is possible to construct and implement a threat-based security system. In such a system, "event" is defined as change in the state of an input service, e.g. a sensor; "group" is defined as a collection of similar events which are regarded as forming a coherent set, e.g. in a security zone; "threat" is determined by reference to the amount and nature of security danger represented by an event, given the sequence and threat levels of previous events; and "action" is the activity to be carried out when a particular type of threat has exceeded a predetermined threshold level, which may be governed by the sequence and nature of previous detected events.

In such a system, events are detected when a particular state of an input service/sensor has changed, e.g. a window sensor changes from being closed to being open. The event so detected is that mapped to a set of groups that contain that particular type of event, e.g. window being opened. Each mapped group has an intrinsic priority level, and the group list is then sorted according to the priority levels, allowing more general groups to be overridden by more specific groups, e.g. allowing all window openings to be monitored except a particular window.

The group of the highest priority is then mapped to a set of threats that would trigger when the group is activated. Each threat will generate a corresponding threat level number and a threat type, depending on the particular event and the sequence of previous events, if any. For example, a window being opened may be particularly suspicious if followed by motion detected by a motion detector close to the window. However, the suspicion level will be less if opening of the window follows motion inside the house, which may indicate someone in the house opening the window for fresh air.

The highest threat level is taken as the threat level of this particular event, since the event may mean different levels of threat for different areas/situations, and only the highest threat level is considered. The system will monitor the current threat level, and the threat level of the current event will be added to the current threat level, under which the degree of threat to the premises is continuously monitored and assessed. If, at any time, the resultant current threat level exceeds a pre-determined level, then one or more predetermined actions will be taken, e.g. an alarm is triggered and/or lights in the garden are turned on. The current threat level will be reduced by a predetermined percentage after the passing of a pre-set period of time between the events, such that events happening between a long period of time are considered to pose less threat than events happening between very short period of time, say, one happening immediately after the other.

As an example, the following Table 1 gives the hypothetical threat level assigned to a list of exemplary events detected by sensors of the security system:

TABLE 1

| Detected Events | Threat Level |
| --- | --- |
| Motion in the garden | 1 |
| Kitchen window opened | 2 |
| Kitchen window opened within five (5) minutes of motion in the garden | 3 |
| Motion in the kitchen | 2 |
| Motion in the kitchen within two (2) minutes of kitchen window opened | 4 |
| Motion in the master bedroom | 2 |
| Motion in the study where a safe is kept | 4 |

Let us assume that the system is set such that:

a. an alarm will be sounded if at any one point, the current threat level reaches at least 10;

b. the current threat level will automatically fall by 10% with the passing of every 5 minutes in which no new event is detected by the system.

In this example, if motion is detected in the garden, the threat level will be 1. If no event is detected for five minutes, the threat level will fall to 0.9, and subsequently to 0.81 if no event is detected for another five minutes. Assume that within 2 minutes of motion in the garden, the kitchen window is detected as opened, the threat level will be 4 (i.e. 1+3). If, then, within 30 seconds of opening of the kitchen window, motion is detected in the kitchen, the threat level will rise to 8 (i.e. 4+4). If, within, five minutes, motion is detected either the master bedroom or the study where a safe is kept, the threat level will rise to 10 or 12. In either case, an alarm will be sounded. If, however, motion is detected in the master bedroom after, say, 6 minutes, the threat level will only be 9.2 (i.e. 8×90%+2), thus not enough to set off the alarm. If, on the other hand, motion is instead detected in the study where a safe is kept after, say, 10 minutes, the threat level will be 10.48 (i.e. 8×90%×90%+4), in which case the alarm will still be set off.

Take another example, if the sequence of events is different, say motion in the study where the safe is kept, followed within five minutes by motion in the kitchen, then followed within five minutes by opening of the kitchen, then followed within five minutes by motion in the garden, the threat level will only be 9, which is not enough to set off the alarm.

The advantages and characteristics of such a threat-based security systems include:
a. instead of focusing solely on the triggering of the individual devices/sensors, the actual events, which are of more concern to occupants of the premises, are also focused upon;
b. an event is made up of a number of device triggering in a particular predetermined order;
c. both the triggering of the devices and the sequence order of such triggering are taken into account; and
d. the threat levels are continuously monitored and assessed, depending on whether certain events have been recorded, and if so, when that event was recorded.

With such an arrangement, each individual event may be categorized in a more intelligent manner, based on the actual degree of threat that it poses. It is, of course, the case that some events are more significant that others. False alarms will be reduced. Security breach events can be distinguished from mere warnings, thus focusing security attention to the actually important incidents. Different response actions can be triggered, depending on the degree of threat, thus ensuring that appropriate actions be taken in response to the relevant incidents.

With the above arrangement of an integrated programmable system according to the present invention, the following functions can be achieved:
a. identity recognition;
b. personalized settings for temperature, lighting, music, audio and/or visual equipment;
c. baby and elderly monitoring;
d. notification of significant events, e.g. by audio signals;
e. hazard detection and warning;
f. flexible control and monitoring of the system via touch pads, infrared remote control apparatus, mobile phones, computers or through the Internet;
g. integration with popular existing electrical and/or electronic appliance interfaces, e.g. X10, emWare, UPnP/Home API, Jini, HAVi, etc.;
h. complete control over lighting of the entire premises, including preset scene lighting, and remote control of lights in another room or area;
i. automatic, scheduled or on-demand recording of video and television shows;
j. a common timing apparatus for (1) keeping calendar and schedules for home members; (2) reminders and event tracking; (3) automatic timed/scheduled events based on environmental situations, e.g. sprinklers on only when not raining; (4) playing pre-set messages or execute pre-determined actions at pre-determined time; (5) intelligent alarm clocks, e.g. also turning on the radio to a pre-set station for reporting the weather and traffic condition;
k. video surveillance and security monitoring of all windows and doors, with motion/smoke detectors activated;
l. intelligent actions upon penetration of security boundary, security triggers or fire threat, e.g. sounding alarms, notifying occupants via telephone or the Internet, or reporting to the police or fire station;
m. creating non-repetitive at-home scenes automatically for discouraging break-ins;
n. allowing, after identification via remote video, entry of visitors, workmen or deliverymen, and full video monitoring of their activities in the premises;
o. announcement of identity of telephone caller;
p. tailored greetings and message boxes for identified telephone callers;
q. specific barring or diversion of particular telephone caller(s);
r. message box for individual and event play back;
s. telephony system being accessed via WAP or normal phone for remote control, message centre access and status monitoring;
t. plug-in Internet and World Wide Web access throughout the entire premises;
u. remote control, video surveillance and status monitoring via the Internet; and
v. intra-premises e-mail services.

It can be seen that various existing and future electrical and/or electronic appliances may be integrated into this system because of the use of existing standard interfaces. It is also up to the end user to incorporate new appliances into the system according to his or her own need, taking into account the physical environment of the premises. Since the system can be connected with such appliances via different existing standard interfaces, a large variety of such appliances can be integrated, thus greatly enhancing the ability of the system to accommodate different sorts of appliances of different manufacturers. Simply stated, a system according to the present invention is an open platform with virtually unlimited possibility of extension and modification.

It should be understood that the above only illustrates examples whereby the present invention may be carried out, and that various modifications and/or alterations may be made thereto without departing from the spirit of the invention. Although the above examples are illustrated with home-oriented examples, it should of course be understood that the invention is equally applicable to other premises, e.g. offices, factories, hospitals, etc.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:
1. An integrated programmable system for controlling the operation of a plurality of electrical and/or electronic appliances of a premises, wherein said plurality of appliances are controllable electrically, electronically, wirelessly, by infrared and/or by radio frequency, wherein said system includes a central data processing apparatus connected with a digital communication backbone, wherein said central data processing apparatus is adapted to be connected with said appliances via said digital communication backbone; wherein said system further includes:
   a. means adapted to a monitor changes of state of at least a first and a second of said appliances; and
   b. means adapted to record in a database changes of state of said first appliance and of said second appliance and the time at which said changes occur;
   and wherein the system is adapted to establish a value when the change of state of the first appliance is recorded and to update said value when the change of state of the second appliance is recorded subsequent to the recorded change of state of the first appliance, and to take a course of action when said value meets a pre-defined criterion.

2. A system according to claim 1, wherein said system includes sound producing means connected to a plurality of sources of audio signals for selectively outputting sound upon receipt of audio signals from at least one of said sources or outputting audible alarm prompts upon receipt of audio signals from said system.

3. A system according to claim 2, wherein said audio signals from said system are prioritized above audio signals from said sources of audio signals.

4. A system according to claim 2, wherein said sound producing member comprises a speaker.

5. A system according to claim 2, wherein said plurality of audio signal sources include said central data processing apparatus, an audio system, an audio-visual system, and a microphone.

6. A system according to claim 1, wherein further characterized in that said data processing apparatus comprises a computer server.

7. A system according to claim 1, wherein said communication backbone includes at least a network hub, switch or router.

8. A system according to claim 1 further including at least one controller for controlling the operation of said plurality of electrical and/or electronic appliances in a predetermined manner.

9. A system according to claim 8, further including a plurality of said controllers which are spaced apart from one another.

10. A system according to claim 1, further being adapted to be connected with said electrical and/or electronic appliances via at least two different standard interfaces.

11. A system according to claim 1, wherein said system is adapted to connect at least two said appliances together by Home Audio Video interoperability (HAVi) standard.

12. A system according to claim 1, further being adapted to be connected with at least one said appliance via Universal Plug and Play (UPnP) architecture.

13. A system according to claim 1, further incorporating a unified devices abstraction layer with at least one translator for translating proprietary means of controlling individual devices into standard interfaces, and thereby to allow said system to control devices in a uniform manner.

14. A system according to claim 1, wherein said system is adapted to be connected with at least one said appliance via a standard serial bus interface.

15. A system according to claim 1, wherein said system is adapted to be connected with at least a lighting device via at least one electrical power control module.

16. A system according to claim 1, further being adapted to be connected with a security system.

17. A system according to claim 16, wherein said system is adapted to be connected with and to connect a plurality of components of said security system via said common communication backbone.

18. A system according to claim 16, wherein said security system includes at least a motion detector.

19. A system according to claim 16, wherein said security system includes at least a speaker.

20. A system according to claim 16, wherein said security system includes means for dialing at least one pre-determined telephone number.

* * * * *